Figure 1:
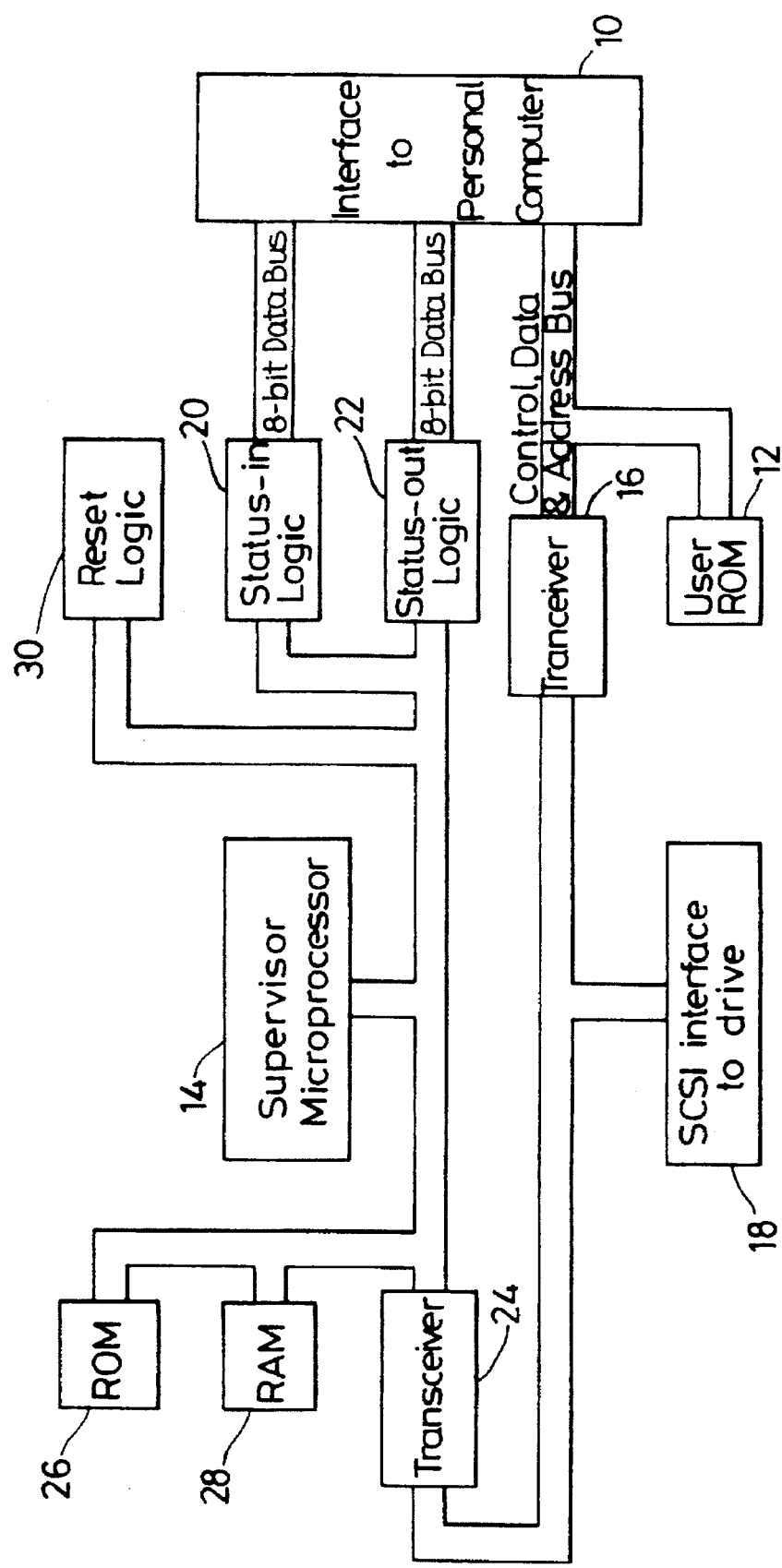

United States Patent [19]
Killean et al.

[11] Patent Number: 5,657,473
[45] Date of Patent: Aug. 12, 1997

[54] METHOD AND APPARATUS FOR CONTROLLING ACCESS TO AND CORRUPTION OF INFORMATION IN COMPUTER SYSTEMS

[75] Inventors: Reginald Killean, Burntisland; David Robb, Aberdeen; Norman Jackson White, Tayside, all of Great Britain

[73] Assignee: Arendee Limited, Edinburgh

[21] Appl. No.: 920,571

[22] PCT Filed: Feb. 20, 1991

[86] PCT No.: PCT/GB91/00261

§ 371 Date: Oct. 21, 1992

§ 102(e) Date: Oct. 21, 1992

[87] PCT Pub. No.: WO91/13403

PCT Pub. Date: Sep. 5, 1991

[30] Foreign Application Priority Data

Feb. 21, 1990 [GB] United Kingdom .................. 9003890

[51] Int. Cl.$^6$ ........................................................ G06F 12/14
[52] U.S. Cl. .......................... 395/490; 395/182.21; 380/4
[58] Field of Search ......................... 364/200 MS File, 364/900 MS File; 395/400, 425, 490, 491, 182.21, 186, 187.01, 188.01, 497.04, 456, 700, 405, 838; 380/3, 4

[56] References Cited

U.S. PATENT DOCUMENTS

| | | | |
|---|---|---|---|
| 3,742,458 | 6/1973 | Inoue et al. | 340/172.5 |
| 3,827,029 | 7/1974 | Schlotterer et al. | 340/172.5 |
| 4,215,400 | 7/1980 | Denko | 395/425 |
| 4,442,484 | 4/1984 | Childs, Jr. et al. | 395/490 |
| 4,590,552 | 5/1986 | Guttage et al. | 395/490 |
| 4,807,284 | 2/1989 | Kleijne | 380/4 |
| 4,926,476 | 5/1990 | Convey | 380/4 |
| 5,022,077 | 6/1991 | Bealkowski et al. | 380/4 |
| 5,144,659 | 9/1992 | Jones | 380/4 |
| 5,144,660 | 9/1992 | Rose | 380/4 |
| 5,155,829 | 10/1992 | Kao | 395/490 |
| 5,317,717 | 5/1994 | Cutler | 395/490 |

FOREIGN PATENT DOCUMENTS 2629231 of 1989 France.

OTHER PUBLICATIONS

Communication from European Patent Office dated Mar. 10, 1993 re: Application No.91904667.2–2215.
Siemens Microcomputer Components: Data Catalog 1986/87, Muchen, pp. 539, 554–565.
Intel, Introduction to the iAPX 286, 1985, Santa Clara, Calif., pp. 3–20 to 3–31.

*Primary Examiner*—Eddie P. Chan
*Assistant Examiner*—Hiep T. Nguyen
*Attorney, Agent, or Firm*—Sixbey, Friedman, Leedom & Ferguson, P.C.; Gerald J. Ferguson, Jr.; Eric J. Robinson

[57] ABSTRACT

An apparatus and method restrict the corruption or destruction of data held on a storage medium forming part of a computer system by hostile programs such as "viruses" by employing a "Supervisor" which controls the reading, writing and formatting of sectors within partitions of a storage medium. The control is dependent upon which type of partition the sector is within, i.e. the boot partition, or an active or inactive general partition, and which type of data the sector contains, i.e. operating system or user information. The Supervisor may be implemented in hardware or firmware, and preferably provides a processor which is inaccessible to the user and to any virus contained in any partition of, for example, a hard disk. The computer system may be reset should an attempt be made to perform a prohibited read, write or format operation.

20 Claims, 3 Drawing Sheets

SUPERVISOR BLOCK DIAGRAM

SUPERVISOR BLOCK DIAGRAM

METHOD AND APPARATUS FOR CONTROLLING ACCESS TO AND CORRUPTION OF INFORMATION IN COMPUTER SYSTEMS

The present invention relates to methods and apparatus for preventing the corruption or destruction of data in computer systems, and is particularly concerned with the detection and containment of hostile programs such as "virus" programs within computer systems. The word "virus", which has become a well-known term in the art, will be used herein as a generic name for all hostile programs.

There is an increasing problem with computer viruses which are introduced into computer systems by clandestine means with consequences of varying degrees of seriousness from minor inconvenience to the system user, to complete destruction of data or disablement of the system. The propagation of viruses can be controlled by controlling the operations which can be performed on particular data or classes of data. However, proposals to date for implementing such classification methods rely on a high degree of user discipline, and/or hardware modification of computers and/or hard disks, and/or software modification of the operating system, and/or knowledge of virus signatures.

It is an object of the present invention to obviate or mitigate the aforesaid disadvantages.

It is a further object of the present invention to provide a method of, and apparatus for, virus detection and containment capable of implementation on a computer system using: a 'standard' version of a given computer operating system; a 'standard' computer capable of operation using such an operating system; and 'standard' computer devices.

In the sense used hereinbefore, the word 'standard' means that which would be routinely purchased from manufacturers of these devices, without special modification.

The invention described herein may aptly be described as a 'Supervisor' ie. an arrangement which controls read, write and format operations performed on data on a storage medium of a computer system. While it is true that an operating system supervises the transfer and storage of all data within a computer system it is also true that a virus can be introduced and can circumvent this supervision if the computer is used with doubtful or unlicensed software. This allows a potential virus to replicate itself, to change, damage or delete data, and even to make the whole system inoperable.

It is, therefore, a further object of the present invention to provide an additional level of supervision which addresses the above circumstances. The invention specifically limits the damage a virus can cause and protects certain existing data areas.

It should, however, be stressed that there exists a hierarchy of potential virus infection ranging from innocent usage of infected software, even after precautions have been followed, through to deliberate sabotage of a system. There is ultimately no defence against this latter situation, given that computer systems are designed to respond to human inputs. The present invention would not claim to prevent this situation either. What it does do is to provide a framework within which a vital attack may be detected and contained. It, therefore, allows the user a mechanism for protection of his files. Starting from a virus-free position, it permits a way of introducing further software or modifications to existing software which, if infected, would corrupt only part of the user's existing system.

According to a first aspect of the invention there is provided a method of controlling access to and modification of information stored on a storage medium forming part of a computer system comprising:

dividing information stored on the storage medium into a plurality of non-overlapping partitions, including a boot partition and a plurality of general partitions, each of the partitions being further divided into a plurality of sectors, any designated subset of the general partitions being active at any given time when the computer system is in use, providing supervising means (a Supervisor) separate of a central processing unit (CPU) of the computer system for controlling the performance of read, write and format operations upon the information stored on the storage medium so as to allow, restrict or prevent such operations depending upon the type of information stored within a sector and type and status of the partition within which the sector is located, the supervising means causing a reset to be required of the computer system should an attempt be made to perform a prohibited read, write or format operation.

In the preferred embodiment of the invention, read operations are allowed on any information in the boot partition, but an attempt to write to or format the boot partition causes a system reset.

Notwithstanding this constraint, write operations to certain designated bytes within the boot partition could be allowed under the direct control of the Supervisor, dependent for example on the requirements of the computer operating system.

As part of the invention, the both sectors of the storage medium are treated as part of the boot partition, irrespective of the position of the starting sector of the boot partition as may be defined by the disk operating system.

Preferably also, reading of any operating system information sectors or user-generated information sectors in an active general partition is allowed, writing to such user-generated information sectors is allowed, and writing to such operating system information sectors is restricted such that an attempt to modify the size or boundaries of the partition causes a system reset.

Preferably also, only the reading of information from operating system sectors of inactive general partitions is allowed, and an attempt to perform any other read, write or format operation on such partitions is either denied or causes a system reset.

According to a second aspect, the invention provides an apparatus for controlling access to and modification of information stored on a storage medium of a computer system, the information on the storage medium being divided into a plurality of non-overlapping partitions, including a boot partition and a plurality of general partitions, each partition being further divided into a plurality of sectors, any designated subset of the general partitions being active at any given time when the computer system is in use, wherein the apparatus comprises a supervising means (a Supervisor) separate of a central processing unit (CPU) of the computer system for controlling the performances of read, write or format operations stored on the storage medium so as to allow, restrict or prevent such operations depending upon the type of information stored within a sector and the type and status of partition within which the sector is located wherein, in use, the supervising means causes a reset to be required of the computer system should an attempt be made to perform a prohibited read, write or format operation.

The invention may provide hardware means or firmware means or a combination of both adapted to be incorporated into an existing system so as to implement the method defined above. This may be in the form of packages which can be mounted within a system or as stand-alone units.

This invention preferably uses a second processor which is made inaccessible to the user and to the virus. This processor's sole purpose is to supervise all data transfers between and within sub-divisions of the device or devices placed under its control.

The processor's function is, therefore, to impose restrictions on certain operations dependent on certain criteria, namely, the data type, the source and destination of the data in question and possibly the user of the machine. The actual information stored does not, however, play any role in the decision process.

A partition, in the case of a storage device such as a hard disk, is considered itself to be a device or a sub-division of a device. In the case of a fileserver the equivalent partition is a node on the network or sub-division of a node. The supervising processor uses these definitions in its decision making process.

The Supervisor may be implemented on a printed circuit board as an expansion card to be inserted into the computer system.

Figure 2:
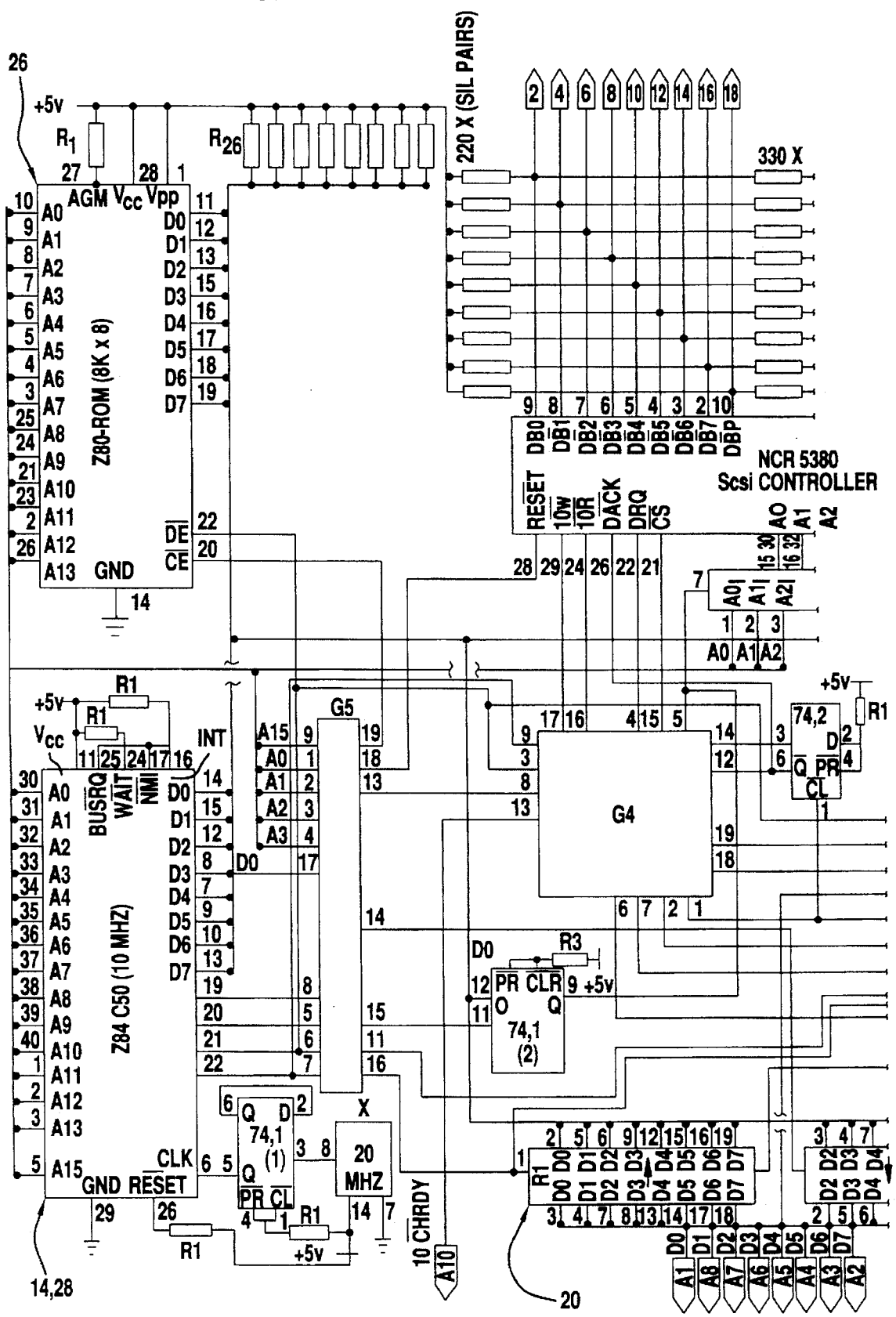
Figure 2A:
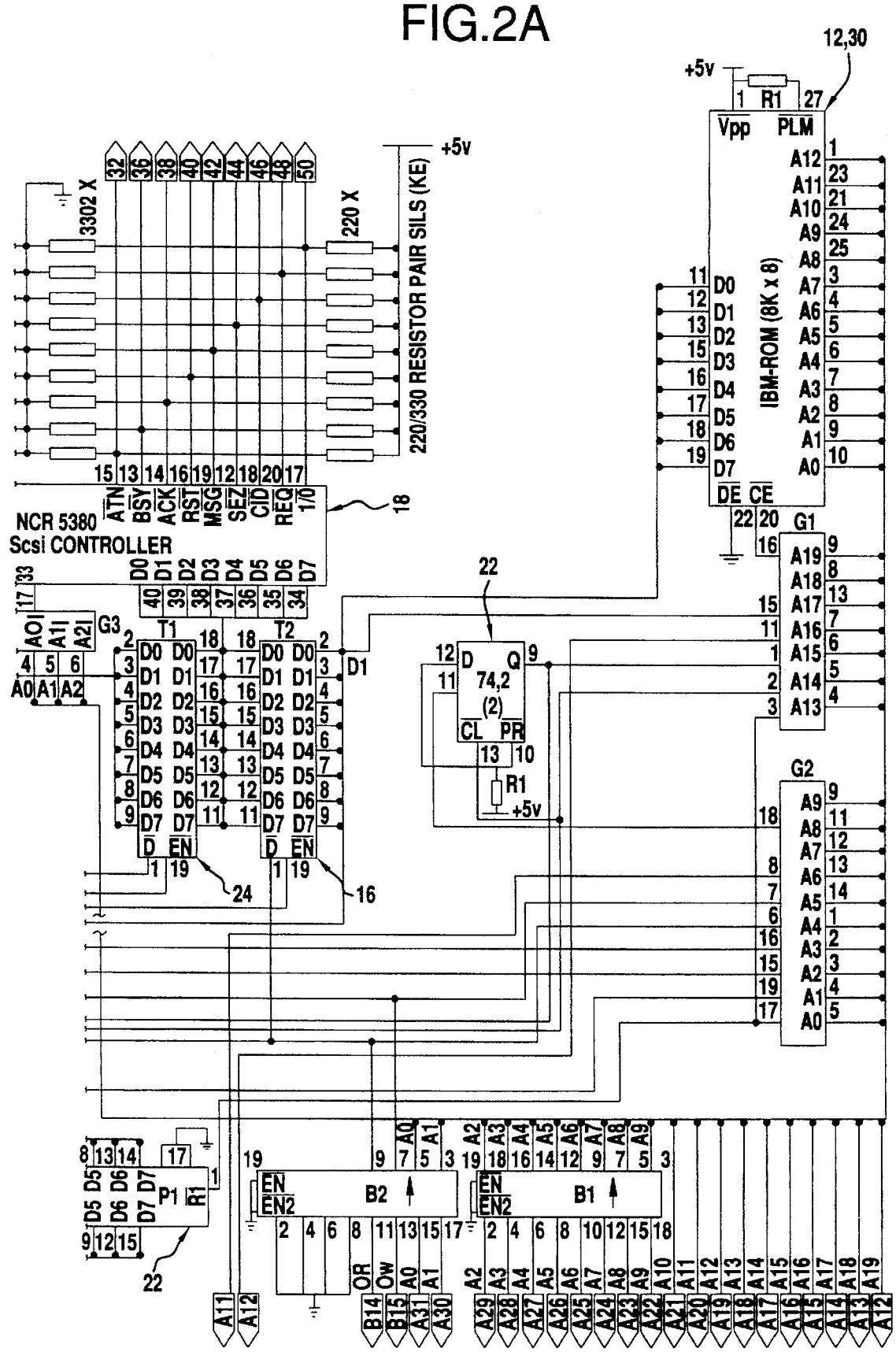

Further details of various aspects of the invention will now be discussed in the following description of an embodiment of the invention, given by way of example only, with reference to the accompanying drawings which are:

FIG. 1 a schematic block diagram of a hardware arrangement embodying a Supervisor according to the present invention; and FIG. 2 a schematic circuit diagram of an actual embodiment of the Supervisor of FIG. 1.

In the following description the storage medium given as an example is a hard disk and the system is an IBM PC.

In general terms the invention relates to the control that the Supervisor exerts over partitions of a storage medium, in this example a hard disk. The user is encouraged to make active use of separate partitions for separate applications programs. The Supervisor stores partition information including, for each partition, the sector bounds and addresses of those sectors containing Operating System information (OS-sectors) and those containing User Information (UI-sectors).

The user may use several partitions on the disk. All these partitions, save for one, are treated in an equivalent way by the Supervisor. In essence, they are kept independent of each other, but may, if required, be linked. The special partition is the boot partition, and may be termed the Unique partition or U-partition. The U-partition will contain, at least, the sectors for booting the hard disk and the DOS operating system files. It could also be used to store other files which are 'read-only' and known to be virus-free.

At any point in time, any one or, if allowed, more of the remaining partitions (general partitions) will be 'Active' and may be termed the A-partition(s). The remaining 'other' partitions may then be termed O-partitions. It will be the user's choice as to which partition or partitions become active, either by deliberate pre-selection at boot or by automatic activation as a result of the first write to OS-sectors or read/write to UI-sectors of a partition other than the U-partition.

The functions of the Supervisor are defined in Table 1. There are three typical disk commands: Read, Write and Format. Table 1 shows how the Supervisor controls these commands depending upon the type and status of the relevant partition and sector.

TABLE 1

| PARTITION TYPE | SECTOR TYPE | READ COMMAND | WRITE COMMAND | FORMAT COMMAND |
| --- | --- | --- | --- | --- |
| U-PARTITION | OS-SECTORS | ALLOW | RESET* | RESET |
| U-PARTITION | UI-SECTORS | ALLOW | RESET* | RESET |
| A-PARTITION | OS-SECTORS | ALLOW | RESTRICTED | ALLOW |
| A-PARTITION | UI-SECTORS | ALLOW | ALLOW | ALLOW |
| O-PARTITION | OS-SECTORS | ALLOW | RESET | RESET |
| O-PARTITION | UI-SECTORS | RESET/WARNING | RESET | RESET |

*excepting designated bytes, if any.

In order to understand the background to the invention it is necessary to give a brief review of certain organizational aspects of DOS, an operating system applicable to 'IBM-compatible' personal computers. A hard disk may be divided by the user into several logically discrete areas called partitions. Each of these partitions is made up of logically consecutive sectors. Within each partition the starting sectors and a number of additional sectors contain, amongst other information, the starting and ending sector addresses of the partition and the information essential for finding the sectors in which a given file is located within the partition. Partitions cannot overlap. Under DOS, the first physical sector of the hard disk also contains essential information regarding the partition geometry. The invention treats this sector as an integral part of the boot partition.

In order to give an understanding of a Supervisor according to the invention, a general description will first be given of the function of the Supervisor, whether it is implemented in hardware, firmware or a combination of both. A specific description of an embodiment of a 'Supervisor' will then be given with reference to FIGS. 1 and 2.

The interpretation of Table 1 is as follows:
(a) At any time, all files in the U-partition may be read. Any attempt to write or format will be detected and result in a reset.
(b) Within an A-partition, reading, writing and formatting is allowed to all files. Note that, where permitted, writing to OS-sectors is termed 'restricted' which means that attempts to modify the partition basic geometry (bounds, size) would be detected by the Supervisor and result in a reset of the computer.
(c) The only command permitted on an O-partition is that of reading OS-sectors. All others will either cause a reset or be denied. In particular, UI-sectors may not be read since the 'read' action could contain an implied 'execute'.

When the Supervisor applies a reset, this in turn results in a cold re-boot of the computer. This reset is critical as memory must be cleared in order to prevent a virus from remaining intact in memory.

Should a virus exist in a program, it can only become active when that program is read from the disk and then executed. By definition, since the U-partition is virus-free, that program could only be stored in a current A-partition and any attempt by the virus to corrupt, that is write to, any file in other partitions would be detected and prohibited. The Supervisor would initiate a reset which would clear memory, load the operating system and bring the computer to a virus-free condition.

Prior to this action, the Supervisor will set a register to an appropriate value and write a message to the disk which, on completion of the re-boot, will be read by the computer and used to define one of a set of non-corruptible messages held in a ROM (Read Only Memory).

This will be sent to the screen of a Video Display Unit of the computer system giving the user information on the reason for the reset and thus warning him of an attempt to write illegally, which could be a signal that a virus is present in the previous A-partition.

Clearly, a virus can be introduced into the hard disk. It can replicate itself and corrupt files, but only in the partition in which it was loaded. Thus, the virus can be contained and it can be detected when it tries to spread outwith the partition in which it resides.

All of the above protection constraints take effect when the Supervisor is in so-called 'supervised' mode. This is the normal default mode when the system is booted from the hard disk.

Initially, however, it is necessary to place the Supervisor in so-called 'unsupervised' mode, in order to allow the setting up of the hard disk in terms of its partitions, and this is achieved by booting from a DOS floppy disk. Once the initial set-up of the hard disk has been achieved, a Password has to be chosen and the Supervisor will only permit itself to be placed in unsupervised mode again when booted from a floppy disk if the same Password is correctly entered on the keyboard.

It will be recognized that the unsupervised mode is potentially dangerous. However, it is necessary to be able to implement this mode for legitimate operations including system set-up and maintenance. Provision is provided for the Password to be changed when the system is put in unsupervised mode.

It is clear from the foregoing that the invention treats the partitions as though they were complete logical disks. At any one time therefore, a current A-partition (or designated set of A-partitions), is for all intents and purposes a hard disk in its own right.

In hardware form the Supervisor may reside in the back plane of the computer and will look like (or be) a modified hard disk adaptor card with the additional capability of resetting the computer. Its hardware will control the hard disk bidirectionally, the intelligence of the Supervisor will be derived from a microprocessor, RISC processor or transputer with the controlling program resident in ROM.

A typical example of the use of the Supervisor would include the addition of a hard disk drive, using a SCSI (Small Computer Systems Interface) interface to a personal computer with no SCSI initiator capability. In this case the Supervisor would be part of the SCSI adaptor card, slotted in the back plane of the computer, which would be needed in any case for interfacing the drive to the computer. Another example would be that of a computer with an existing SCSI output port, to which a SCSI drive is coupled. Then the Supervisor would be a (smaller) card attached to the SCSI connector port to which the drive cable would attach.

Alternatively, in the firmware form the Supervisor could simply consist of modifications to the hard disk firmware and to the firmware of a suitable SCSI adaptor card. The Supervisor would then intercept SCSI signals, but would be designed to be effectively transparent to either the host or the drive.

Whether in hardware or firmware form, the Supervisor will have sufficient volatile memory to hold the DOS operating system parameters that define the partition structure.

Referring now to FIG. 1 there is shown a block diagram of a hardware arrangement suitable for implementing the Supervisor. The Supervisor provides a typical hard disk adaptor card interface 10 to a mother board of a personal computer (PC) or the like, and Read Only Memory (ROM) 12 containing an appropriate BIOS (Basic Input/Output System) driver for operation of the hard disk.

The Supervisor hardware embodying the invention includes a microprocessor 14 and a transceiver 16, which allow the PC restricted access to a SCSI 18 such that the PC cannot directly select or arbitrate for the disk drive or issue commands over the SCSI interface 18. These operations can be performed only by the Supervisor microprocessor 14, which communicates bidirectionally with the PC using status in/out ports 20 and 22.

Communication between the microprocessor 14 and the SCSI interface 18 takes place via the bidirectional ports of a second transceiver 24. The Supervisor also includes its own Read Only Memory (ROM) 26, holding a Supervisor Operating System and a control program, and Random Access Memory (RAM) 28, which is a scratch memory used to hold parameters. Reset logic 30 is also provided, and is used for clearing the PC memory if and when an attempt is made to perform an operation prohibited by the Supervisor.

Referring to FIG. 2 there is shown a schematic diagram of an actual embodiment of the invention with the integers numbered identically to those of FIG. 1.

The embodiment of FIG. 2 further includes the following components: Gate Array Logic (GAL) devices G1–G5; buffers B1, B2; and flip-flops 74.1(1), 74.1(2), 74.2(1) and 74.2(2).

The function of these components is as follows. G1 maps the ROM BIOS into the IBM memory map, and also provides tristate connection of the output of flip-flop 74.2(2) to the IBM data bus.

G2 provides access by the IBM to a subset of the SCSI controller's internal registers by mapping them into the IBM I/O space. G2 further provides pseudo-DMA decoding logic for date transfer to/from the SCSI controller, and maps a flag, ie. flip-flop 74.2(2) and latch P1 into the IBM I/O space.

G3 multiplexes between the Supervisor and IBM address buses, to the SCSI controller address bus.

G4 multiplexes between the Supervisor and IBM control lines, to the SCSI controller. G4 also enables either (but never both) transceivers T1, T2, and includes logic for possible wait state during data transfers between the IBM and the SCSI controller.

G5 maps all ports in the Supervisor I/O space: Latches P1, P2, SCSI reset line and flip-flops 74.1(2) and 74.2(2). G5 further maps ROM into the Supervisor memory map, and provides tristate connection of output of flip-flop 74.2(2) to the Supervisor data bus.

The buffers B1, B2 ensure that there can be only one gate draining current from the IBM Backplane for each of the address, IOR and IOW lines.

Flip-flop 74.1(1) divides the clock frequency by two and squares up the pulses. Dependent on the output of 74.1(2), either the IBM has access (restricted) or the Supervisor has access, to the SCSI controller.

74.2(1) provides part of the timing for wait state generation during SCSI date transfer, while 74.2(2) is a flag to indicate that a data byte has been sent by the IBM for the attention of the Supervisor.

The components of the embodiment of FIG. 2 are as follows. GAL's G1–G5 are of the type SGS Thomson GAL 16V8-15ns; flip-flops 74.1(1), 74.1(2), 74.2(1) and 74.2(2) are of the type 74ALS74; buffers B1, B2 are 74ALS244's; latches P1, P2 are 74ALS373's; transceivers T1, T2 are 74F245's; the processor 14 is a Zilog Z84C50 (10 MHz); the ROM 12 a 2764A (8k×8); and the SCSI controller 18 a NCR 5380.

Inspection of FIG. 2 clearly shows that a virus can never interfere with the Supervisor microprocessor 14 since it is only able to fetch executable code from its own ROM 26.

A more detailed description of the embodiment of the Supervisor shown in FIG. 2 is not given herein, as this would be within the normal understanding of a person skilled in the art.

Other options within the scope of the invention are possible. For example in firmware form, the Supervisor could substantially be resident on the hard disk itself. It could also handle hard disks which have interfaces other than SCSI, e.g. AT or ESDI.

In general the principles of the embodiment of the invention hereinbefore described apply to the coupling of any hard disk to any computer by any interface. For example, the invention could equally be applied to the popular Apple Macintosh range of personal computers which use an operating system different from DOS. Furthermore, it should be appreciated that application also exists for multi-user fileservers, in which case the Supervisor on the fileserver will require to be aware of which user (terminal) is using which fileserver partition so that it knows which computer to reset if an illegal request is made.

As will be seen from the foregoing, the invention provides a means of protecting computer systems against virus infection and may be implemented in hardware or firmware with no modification of an existing hardware or operating system. Further, it requires virtually no active participation by the user in order to be effective. Devices which could be protected by the invention include, for example, hard disk drives, floppy disk drives, optical disk drives, tape drives, file servers and networks.

We claim:

1. An apparatus for controlling access to and modification of information stored on a storage medium of a computer system, the information on the storage medium being divided into a plurality of non-overlapping partitions including a boot partition and a plurality of general partitions, each partition being capable of containing ties and each partition further being divided into a plurality of sectors, any designated subset of the general partitions being capable of being made active at any given time when the computer system is in use, wherein the apparatus comprises a supervising means separate of a central processing unit (CPU) of the computer system for, in use, allowing/restricting/prohibiting read/write operations upon the storage medium depending upon whether information to be read from a sector or written to a sector is operating system information or user information, whether the sector is in the boot partition or in a general partition, and whether if the partition is a user partition the partition is active or inactive, and allowing a format operation only on a general partition which is active and prohibiting a format operation on the boot partition or on a general partition which is inactive, and reset means connected with said supervisor means for resetting the computer system should an attempt be made to perform a prohibited read, write or format operation, in use.

2. An apparatus as claimed in claim 1, wherein the apparatus comprises hardware adapted to be incorporated into the computer system.

3. An apparatus as claimed in claim 1, wherein the apparatus comprises firmware adapted to be incorporated into the computer system.

4. An apparatus as claimed in claim 1, wherein the apparatus comprises a combination of both hardware and firmware, both being adapted to be incorporated into the computer system.

5. An apparatus as claimed in claim 1, said apparatus further comprising a processor which is made inaccessible to a user and to any virus and which supervises all data transfers between and within sub-divisions of the storage medium or storage media placed under its control.

6. An apparatus as claimed in claim 2, said apparatus further comprising a processor which is made inaccessible to a user and to any virus and which supervises all data transfers between and within sub-divisions of the storage medium or storage media placed under its control.

7. An apparatus as claimed in claim 3, said apparatus further comprising a processor which is made inaccessible to a user and to any virus and which supervises all data transfers between and within sub-divisions of the storage medium or storage media placed under its control.

8. An apparatus as claimed in claim 4, said apparatus further comprising a processor which is made inaccessible to a user and to any virus and which supervises all data transfers between and within sub-divisions of the storage medium or storage media placed under its control.

9. A method of controlling access to and modification of information stored on a storage medium forming part of a computer system including a supervising means separate from a central processing unit (CPU) of the computer system, wherein information stored on the storage medium is divided into a plurality of non-overlapping partitions, including a boot partition and a plurality of general partitions, each of the partitions being capable of containing files and each partition further being divided into a plurality of sectors, any designated subset of the general partitions being capable of being made active at any given time when the computer system is in use, comprising the steps of:

allowing/restricting/prohibiting read/write operations upon the storage medium using said supervision means depending upon whether information to be read from a sector or written to a sector is operating system information or user information, whether the sector is in the boot partition or in a general partition, and whether if the partition is a general partition the partition is active or inactive;

allowing a format operation only on a general partition which is active and prohibiting a format operation on the boot partition or on a general partition which is inactive, and causing a reset of the computer system should an attempt be made to perform a prohibited read, or format operation.

10. A method as claimed in claim 9, wherein read operations are allowed on any information in the boot partition, but an attempt to write or format the boot partition causes a system reset.

11. A method as claimed in claim 10, wherein boot sectors of the storage medium are considered to be part of the boot partition, irrespective of the position of the starting sector of the boot partition as may be defined by the storage medium operating system.

12. A method as claimed in claim 11, wherein an active general partition includes operating system information sectors and user-generated information sectors and wherein reading of any of said operating system information sectors or user-generated information sectors in said active general partition is allowed, writing to said user-generated information sectors is allowed, and writing to said operating system information sectors is restricted such that an attempt to modify the size or boundaries of the active general partition causes a system reset.

13. A method as claimed in claim 10, wherein an active general partition includes operating system information sectors and user-generated information sectors and wherein reading of any of said operating system information sectors or user-generated information sectors in said active general partition is allowed, writing to said user-generated information sectors is allowed, and writing to said operating system information sectors is restricted such that an attempt to modify the size or boundaries of the active general partition causes a system reset.

14. A method as claimed in claim 9, wherein boot sectors of the storage medium are considered to be part of the boot partition, irrespective of the position of the starting sector of the boot partition as defined by the storage medium operating system.

15. A method as claimed in claim 14, wherein an active general partition includes operating system information sectors and user-generated information sectors and wherein reading of any of said operating system information sectors or user-generated information sectors in said active general partition is allowed, writing to said user-generated information sectors is allowed, and writing to said operating system information sectors is restricted such that an attempt to modify the size or boundaries of the active general partition causes a system reset.

16. A method as claimed in claim 9, wherein an active general partition includes operating system information sectors and user-generated information sectors and wherein reading of any of said operating system information sectors or user-generated information sectors in said active general partition is allowed, writing to said user-generated information sectors is allowed, and writing to said operating system information sectors is restricted such that an attempt to modify the size or boundaries of the active general partition causes a system reset.

17. A method as claimed in claim 9, wherein inactive general partitions include operating system sectors and the reading of information from said operating system sectors of said inactive general partitions is allowed, and an attempt to perform any other read, write or format operation on said inactive general partitions is either denied or causes a system reset.

18. A method as claimed in claim 9, wherein the restriction or prevention of the performance of read, write and format operations can be removed to allow set-up or maintenance of the storage medium and thereafter reinstated.

19. A method as claimed in any of claims 9 to 18, wherein the storage medium is any one of a hard disk, a floppy disk, an optical disk and a tape.

20. A method as claimed in any of claims 9 to 18, wherein the storage medium is a fileserver, and the computer system is a local area network including a plurality of user computers, and an identity of each user computer that is using a partition of the fileserver is determined such that an attempt by a user computer to perform a prohibited operation causes a reset to be required of that user computer.

* * * * *